United States Patent [19]
Flewitt et al.

[11] Patent Number: 6,027,150
[45] Date of Patent: Feb. 22, 2000

[54] AUTOMOTIVE VEHICLE RADIATOR GRILLE ASSEMBLY

[75] Inventors: Malcolm Harold Flewitt, Tyne & Wear; Adrian Jonathan Gregory, Nr Banbury, both of United Kingdom

[73] Assignee: Jaguar Cars Limited, Allesley, United Kingdom

[21] Appl. No.: 09/132,874

[22] Filed: Aug. 12, 1998

[30] Foreign Application Priority Data

Aug. 13, 1997 [GB] United Kingdom .................... 9717042

[51] Int. Cl.⁷ ........................... B60R 19/52; B60K 11/04
[52] U.S. Cl. ........................................... 293/115; 180/68.6
[58] Field of Search ............................ 293/115; 180/68.6

[56] References Cited

U.S. PATENT DOCUMENTS

| | | | |
|---|---|---|---|
| 1,941,797 | 1/1934 | Green | 180/68.6 |
| 3,792,889 | 2/1974 | Fuener et al. | 293/115 |
| 4,753,468 | 6/1988 | Szymczak et al. | 293/115 X |
| 4,917,203 | 4/1990 | Sacco et al. | 180/68.6 |
| 4,944,540 | 7/1990 | Mansoor et al. | 293/115 |
| 5,482,336 | 1/1996 | Rouse et al. | |
| 5,487,575 | 1/1996 | Chase | 293/115 |

*Primary Examiner*—D. Glenn Dayoan
*Assistant Examiner*—Chad D Wells
*Attorney, Agent, or Firm*—David B. Kelley

[57] ABSTRACT

A radiator grille assembly for an automotive vehicle includes a radiator grille having an upper edge, a lower edge, and an upper portion, the upper edge engaging the hood and the lower edge engaging and adjacent to the vehicle bumper and resilient arms securing the upper portion to the vehicle, the resilient means biasing the upper edge of the radiator grille into engagement with the hood when the hood is in a latched position.

5 Claims, 3 Drawing Sheets

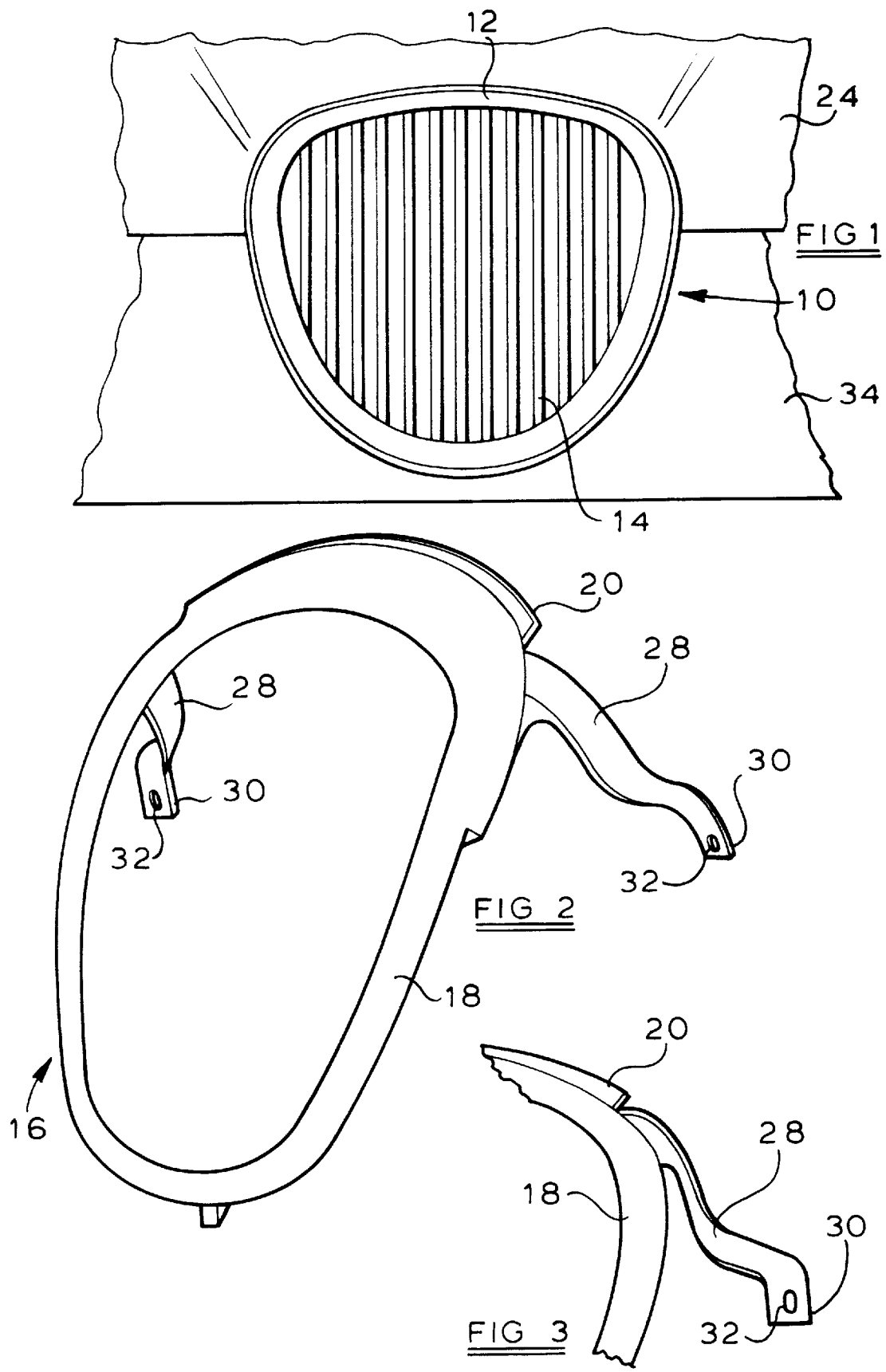

AUTOMOTIVE VEHICLE RADIATOR GRILLE ASSEMBLY

FIELD OF THE INVENTION

The present invention relates to automotive vehicle radiator grille assemblies, and more specifically, to radiator grill assemblies that allow relative movement between such assemblies and adjacent panels.

BACKGROUND OF THE INVENTION

Automotive vehicles are typically equipped with a grille structure that serves both a functional and aesthetic purpose. The functional purpose is to provide air flow to the radiator when the vehicle is in operation. Such air flow to the radiator allows the radiator to perform the function of cooling the vehicle engine. The aesthetic purpose is to achieve the consumer desire to drive an attractive vehicle. The grille is often considered the visual centerpiece of the vehicle and, therefore, is given much attention and design consideration. This attention, while producing an aesthetically pleasing grille, necessarily adds cost to the grill structure. The cost of the grill structure typically exceeds the cost of adjacent body panels, such as the forward bumper. The bumper is typically manufactured from a low cost polymer, for example, while the grille is often manufactured from a more expensive material and requires an expensive painting or chroming process.

The grill structure is typically assembled to the forward bumper in rigid fashion. The grill can also be manufactured along with the bumper as a unitary structure. Either way, conventional grills are not adapted to move independently of the bumper. These assemblies are disadvantageous in the case of low speed front end collisions. More specifically, in a low speed collision the bumper is adapted to displace or flex and return to an initial position with minimal damage to the bumper structure. This is possible because flexible polymeric materials are used to fabricate the bumper. Such a low speed collision however, will damage the grill structure because of the rigid attachment of the grill structure to the bumper. The grill is typically fabricated from a rigid or brittle material and is not as resilient as the bumper. Where the bumper resiliently flexes and returns to a pre-displacement position upon impact, therefore, the grill will crack or break due to the brittle nature of the material used. It is therefore possible to have a low speed collision where the bumper is undamaged, but the grill is destroyed and must be replaced. The aforementioned cost of the grill makes such a scenario an expensive one.

It is therefore desirable to provide a radiator grille assembly in which the grille conforms closely with adjoining bumper and panels of the motor vehicle, while permitting relative movement between the grille and bumper in the event of low impact collisions.

SUMMARY OF THE INVENTION

In accordance with one aspect of the present invention a radiator grille assembly including a radiator grille having an upper edge, a lower edge, and an upper portion, the upper edge engaging the hood and the lower edge adjacent to the vehicle bumper and resilient means securing the upper portion to the vehicle, the resilient means biasing the upper edge of the radiator grille into engagement with the hood when the hood is in a latched position.

Resilient mounting of the upper part of the radiator grille in this manner will advantageously permit rearward movement of the grille with the bumper, upon slow speed impacts, the grille rebounding with the bumper under the influence of the resilient mounting.

According to a preferred embodiment of the invention, the grille is made of resilient material, for example acrylonitrile butadiene styrene polycarbonate blend, and has arms formed integrally with the grille by which the upper part of the grille is resiliently mounted with respect to the vehicle. Alternatively, independent spring means may act between the upper part of the grille and the vehicle body.

According to a preferred embodiment of the present invention, a cam surface extends rearwardly from the forward edge of the hood, for guiding movement of the radiator grille as it moves rearwardly with the bumper, the upper part of the grille being guided in this manner, to avoid damage to the grille by contact with the leading edge of the hood.

BRIEF DESCRIPTION OF THE DRAWINGS

Other features and advantages of the present invention will become apparent to those skilled in the automotive vehicle arts upon reading the following description with reference to the accompanying drawings, in which:

FIG. 1 is a front view of a radiator grille in accordance with the present invention;

FIG. 2 is a perspective view of the radiator grille illustrated in FIG. 1 according to the present invention;

FIG. 3 is a partial front elevation of the upper portion of the radiator grille;

DETAILED DESCRIPTION OF THE PREFERRED EMBODIMENT

Figure 4:
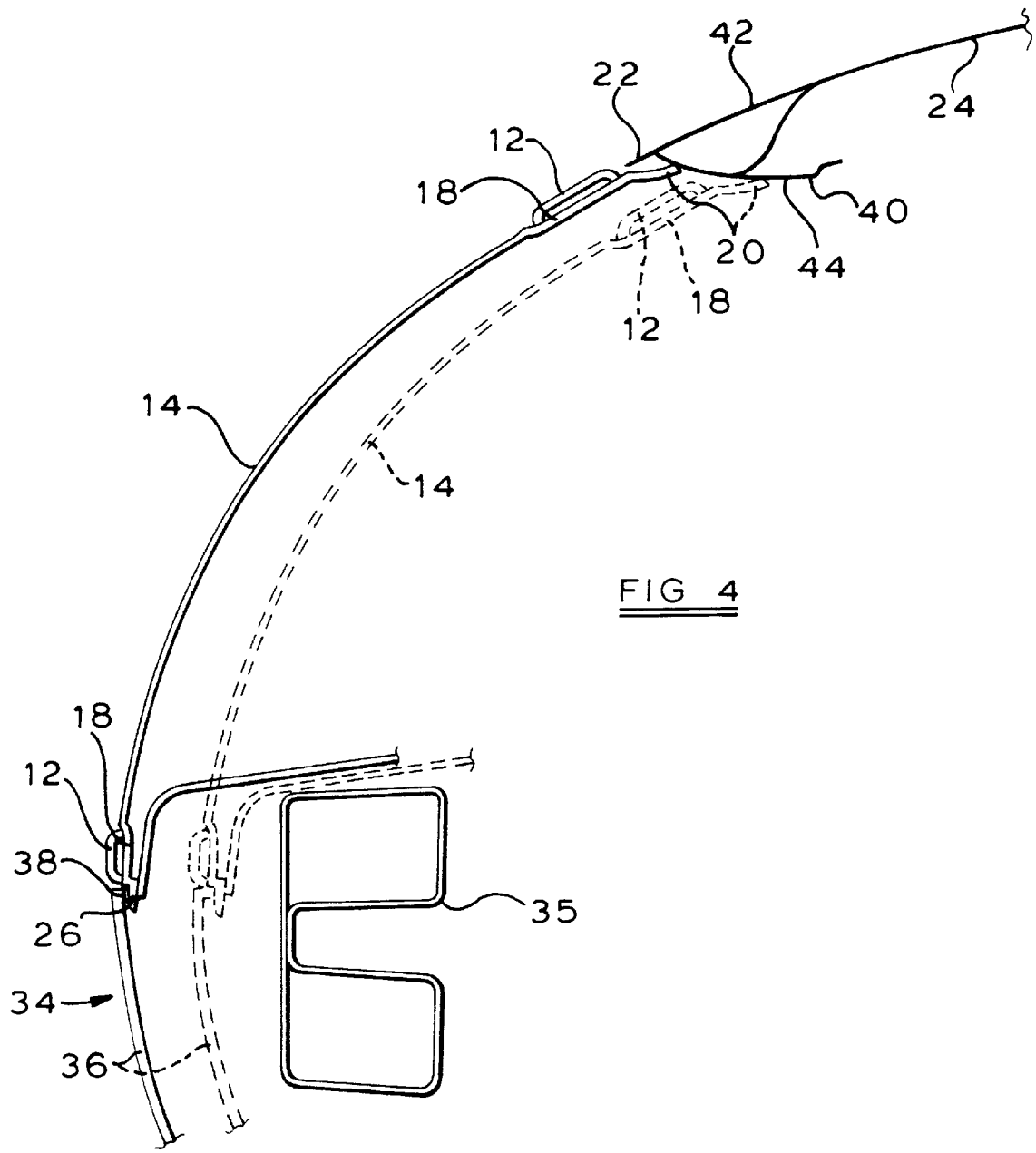
FIG. 4 is a longitudinal sectional view through the center line of the grille shown in FIG. 1 illustrating rearward movement of the grille with the bumper.

As illustrated in FIG. 1, a radiator grille 10 for a automotive vehicle comprises a bezel 12 with vanes 14 running parallel to one another vertically, from one side of the bezel 12 to the other. The radiator grille 10 is preferably formed in two parts from acrylonitrile butadiene styrene polycarbonate blend.

As illustrated in FIGS. 2 and 3, a vane block 16 comprising a rim 18 which conforms to the periphery of the radiator grille 10 and from which the vanes 14 (not shown) extend from the inner periphery of rim 18 on one side, to the inner periphery of the rim 18 on the other side.

Figure 5:
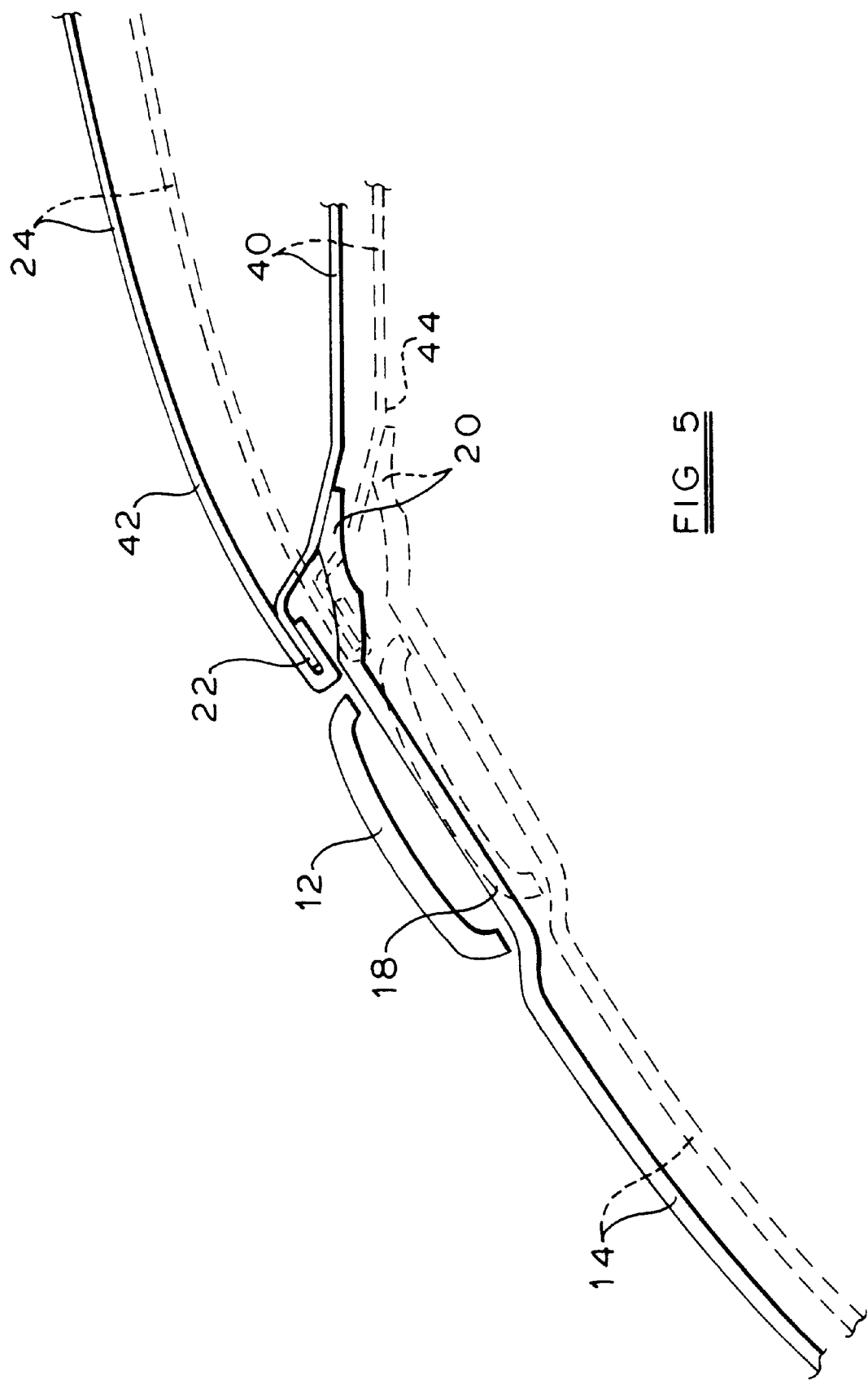
FIG. 5 is a longitudinal sectional view of the radiator grille shown in FIG. 1 illustrating movement of the grille as the hood is closed.

An arcuate formation 20 extends from the upper edge of the rim 18 and forms a cam follower formation for engagement of the underside of the leading edge 22 of a hood 24, as illustrated in FIGS. 4 and 5.

As further shown in FIGS. 4 and 5, a peg formation 26 is provided centrally of the lower edge of rim 18, the peg formation 26 projecting downwardly.

As shown in FIGS. 2 and 3, a pair of resilient arms 28 extend, one from either side of the rim 18 symmetrically of the vertical centre line, the arms 28 being located towards the upper portion of the rim 18. The arms 28 terminate in lug formations 30 with apertures 32, by which the arms 28 may be secured to a fixed structure of the motor vehicle. The arms 28 are formed so as to permit flexing to allow both downward and rearward movement of the upper part of the radiator grille 10.

A separate bezel 12, as illustrated in FIGS. 4 and 5, which may also be formed of acrylonitrile butadiene styrene polycarbonate blend and which may be chrome plated, is secured to the rim 18 of the vane block 16, in suitable manner. The bezel 12 may be secured to the vane block 16 for example by means of plastic projections (not shown) from the rear face of the bezel 12, which clip into or are bonded to corresponding formations on the rim 18.

The radiator grille 10 is mounted on a vehicle bumper 34, the bumper 34 being of conventional construction comprising a fixed beam 35 with energy absorbing foam and a flexible polypropylene cover 36. The radiator grille 10 is attached to the bumper 34 by engagement of the peg formation 26 in an aperture 38 in the cover 36, as shown in FIG. 4. The radiator grille 10 is then secured in place by fixing the lug formations 30 of flexible arms 28, to fixed anchoring points on the vehicle, located rearwardly of the bumper 34. The cover 36 of the bumper 34 is contoured to conform closely with the outer edge of the lower portion of the bezel 12 and provide a small uniform gap therewith.

As shown in FIGS. 4 and 5, the leading edge 22 of the hood 24 has a flange which surrounds the radiator grille 10 and conforms closely with the outer edge of the upper portion of the bezel 12 again providing a small uniform gap therewith. An inner panel 40 on the hood 24 is bonded to the outer panel 42. The inner panel 40 is contoured to provide a rearwardly extending cam surface 44.

When the hood 24 is closed, the arcuate formation 20 engages the inner panel 40 of the bonnet 24, so that the upper part of the radiator grille 10 is pushed downwardly, flexing the arms 28. The radiator grille 10 is thereby resiliently biased into engagement with the underside of the leading edge 22 of hood 24, thereby maintaining the uniform close tolerance gap therewith.

As illustrated in FIG. 5, the resilient arms 28 also permit the radiator grille 10 to be deflected upon over-slamming of the hood 24, so that the required gap will be maintained as the bonnet 24 and grille 10 rebound.

In order to accommodate slow speed impacts, without permanent deformation of the bumper 24, the cover 36 of the bumper 34 must be capable of being displaced by up to 75 mm and rebounding back to its original position. As illustrated in FIG. 4, rearward movement of the bumper cover 36 in this manner, will also cause the lower part of the radiator grille 10 to move rearwardly. This rearward movement of the radiator grille 10 is permitted without damage to the radiator grille 10, by flexing of the arms 28. As the radiator grille 10 moves rearwardly, the arcuate formation 20 on the radiator grille 10 follows the cam surface 44, so that the upper part of the radiator grille 10 moves downwardly. This downward movement provides a clearance for the bezel 12, so that it will not be damaged by contact with the leading edge 22 of the bonnet 24. In this manner, the gap between the bezel 12 and the leading edge 22 of the bonnet 24 may be minimized giving the appearance of a high quality good fitting build.

The resilience of the arms 28 will cause the radiator grille 10 to move back with the bumper cover 36 as it rebounds.

Various modifications may be made without departing from the invention. For example, while in the above embodiment the radiator grille is made in two parts for convenience, the radiator grille may alternatively be of one part construction. Furthermore, while it is preferable to form the radiator grille from resilient plastics material, other materials, for example metals, may alternatively be used. Where the grille is of two part construction, two dissimilar materials may be used for the two parts.

While in the above embodiment the radiator grille 10 is mounted to the vehicle body by means of resilient arms formed integrally of the grille, separate spring means secured to the vehicle body may alternatively be arranged to act against the upper part of the radiator grille, to provide a similar effect.

We claim:

1. A radiator grille assembly for an automotive vehicle with a rear hinged hood having a cam surface and a vehicle bumper, the grill assembly comprising:

a radiator grille having an upper edge, a lower edge, and an upper portion, the upper edge engaging the hood and the lower edge adjacent to the vehicle bumper; and resilient means securing the upper portion to the vehicle, the resilient means biasing the upper edge of the radiator grille into engagement with the hood when the hood is in a latched position, the resilient means comprising at least one resilient arm formed integrally with the grille thereby providing for the upper portion of the grille to be resiliently mounted to the vehicle.

2. A radiator grille assembly according to claim 1 in which the radiator grille is formed from acrylonitrile butadiene styrene polycarbonate.

3. A radiator grille assembly according to claim 1 wherein the hood cam surface is engaged by the upper edge of the radiator grille, thereby controlling movement of the upper portion of the radiator grille upon rearward movement of the radiator grille with the bumper.

4. A radiator grille assembly according to claim 5 wherein a cam follower formation is provided on the upper portion of the radiator grille.

5. A front and assembly for an automotive vehicle comprising:

a hood having a forward edge and a rearward edge, the forward edge having a cam surface projecting rearwardly and inwardly therefrom and the rearward edge having a hinge pivotally attaching the hood to the vehicle;

a vehicle bumper;

a radiator grille having an upper edge, a lower edge, and an upper portion, the upper edge slidably engaging the hood cam surface and the lower edge rigidly engaging the vehicle bumper; and resilient means securing the grille upper portion to the vehicle, the resilient means biasing the grille upper edge into engagement with the hood forward edge when the hood is in a latched position.

\* \* \* \* \*